United States Patent
Nishizawa et al.

(10) Patent No.: US 10,583,990 B2
(45) Date of Patent: Mar. 10, 2020

(54) APPARATUS FOR CONVEYING MOLDED BODY FOR HEAT EXCHANGER FINS

(71) Applicant: HIDAKA SEIKI KABUSHIKI KAISHA, Tokyo (JP)

(72) Inventors: Junichi Nishizawa, Tokyo (JP); Keiichi Morishita, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/307,988

(22) PCT Filed: Oct. 20, 2016

(86) PCT No.: PCT/JP2016/081056
§ 371 (c)(1),
(2) Date: Dec. 7, 2018

(87) PCT Pub. No.: WO2018/073930
PCT Pub. Date: Apr. 26, 2018

(65) Prior Publication Data
US 2019/0337724 A1 Nov. 7, 2019

(51) Int. Cl.
*B65G 29/00* (2006.01)
*B23P 15/26* (2006.01)
*B65G 23/06* (2006.01)

(52) U.S. Cl.
CPC .............. *B65G 29/00* (2013.01); *B23P 15/26* (2013.01); *B65G 23/06* (2013.01); *B65G 2201/0276* (2013.01)

(58) Field of Classification Search
CPC ........ B65G 23/06; B21D 43/04; B65H 20/00; B65H 20/20; B65H 20/22; B65H 23/188
(Continued)

(56) References Cited

U.S. PATENT DOCUMENTS 3,073,497 A * 1/1963 Castleton ................. B41J 11/30
226/74
3,507,431 A 4/1970 Hepp et al.
(Continued)

FOREIGN PATENT DOCUMENTS

CN 10380162 A 5/2014
JP 61-277543 * 12/1986 ............. B65H 20/20
(Continued)

OTHER PUBLICATIONS

International Search Report, issued in PCT/JP2016/081056, dated Dec. 20, 2016.
(Continued)

*Primary Examiner* — James R Bidwell
(74) *Attorney, Agent, or Firm* — Birch, Stewart, Kolasch & Birch, LLP

(57) ABSTRACT

Provided is a conveying apparatus for conveying a molded body for heat exchanger fins that can achieve high-speed conveyance of a molded body for heat exchanger fins, prevent generation of noise during conveyance, and have a smaller size. A solution is a conveying apparatus for conveying in a predetermined direction, a molded body for heat exchanger fins in a stage after a metal thin plate is provided with through-holes and before the metal thin plate is cut into a predetermined length in a conveying direction, the apparatus including: a rotary conveying body including a plurality of protrusions that are tapered and can enter the through-holes, and including a rotation shaft in a direction orthogonal to the conveying direction of the molded body for heat exchanger fins in a horizontal plane; and a rotary conveying body driving unit that rotates and drives the rotary conveying body, wherein a side surface shape of each of the protrusions is a shape to enable the protrusion to enter the through-hole with a space maintained in synchronization with a rotation of the rotation shaft, and retract from the
(Continued)

through-hole while the protrusion conveys the molded body for heat exchanger fins in contact with the through-hole.

7 Claims, 12 Drawing Sheets

(58) Field of Classification Search
USPC .................. 226/52, 76, 77; 198/834, 835
See application file for complete search history.

(56) References Cited

U.S. PATENT DOCUMENTS

| | | | | |
|---|---|---|---|---|
| 3,969,828 | A * | 7/1976 | Roberts .................. | D06B 15/06 34/398 |
| 4,738,386 | A * | 4/1988 | Itemadani .............. | B65H 20/20 156/750 |
| 4,925,076 | A * | 5/1990 | Unuma ................... | B41J 11/30 226/74 |
| 5,139,190 | A * | 8/1992 | Ferguson ............... | B65H 20/20 226/170 |
| 6,270,265 | B1 * | 8/2001 | Fuss ........................ | G03B 1/24 226/76 |
| 2006/0071110 | A1 | 4/2006 | Tashiro et al. | |
| 2008/0298871 | A1 * | 12/2008 | Iwabuchi ................ | B41J 11/28 400/616.3 |
| 2013/0134203 | A1 | 5/2013 | Karasawa et al. | |
| 2015/0364891 | A1 | 12/2015 | Kojima et al. | |
| 2016/0192548 | A1 * | 6/2016 | Ohashi ............... | H05K 13/0417 156/750 |

FOREIGN PATENT DOCUMENTS

| | | |
|---|---|---|
| JP | 1-288557 A | 11/1989 |
| JP | 3-82572 A | 4/1991 |
| JP | 7-25511 A | 1/1995 |
| JP | 2006-21876 A | 1/2006 |
| JP | 2006-89269 A | 4/2006 |
| JP | 2007-8712 A | 1/2007 |
| JP | 2013-111600 A | 6/2013 |
| JP | 2014-187047 A | 10/2014 |

OTHER PUBLICATIONS

Chinese Office Action and Search Report for Chinese Application No. 201680088737.0 dated Nov. 27, 2019, with partial English translation.

Korean Office Action, dated Sep. 25, 2019, for Korean Application No. 10-2019-7000499, with an English translation.

* cited by examiner

CONVEYING DIRECTION →

↓ CLOSE MOVABLE CLAMPER
OPEN FIXED CLAMPER

↓ FEED THIN PLATE HELD BETWEEN
MOVABLE CLAMPERS

↓ CLOSE FIXED CLAMPER
OPEN MOVABLE CLAMPER

RETURN WITH MOVABLE CLAMPER OPENED

APPARATUS FOR CONVEYING MOLDED BODY FOR HEAT EXCHANGER FINS

TECHNICAL FIELD

The present invention relates to an apparatus for conveying a molded body for heat exchanger fins having a plurality of through-holes.

BACKGROUND ART

A heat exchanger such as an air conditioner is generally formed by stacking a plurality of heat exchanger fins. The heat exchanger fin has a plurality of through-holes or cutaway portions through which heat exchange tubes are inserted.

Such heat exchanger fins can be manufactured by using an apparatus for manufacturing heat exchanger fins as illustrated in FIG. 13.

An apparatus 200 for manufacturing heat exchanger fins includes an uncoiler 212 where a metal thin plate 210 of aluminum or the like as a thin-plate material has been wound into a coil shape. The metal thin plate 210 pulled out from the uncoiler 212 via pinch rollers 214 is inserted into an oil application device 216 where machining oil is applied on a surface of the metal thin plate 210. Then, the metal thin plate 210 is supplied to a mold 220 that is provided in a mold press unit 218.

The mold 220 includes an upper die set 222 that is vertically movable in an internal space of the mold 220, and a lower die set 224 that is in a stationary state. By this mold 220, a plurality of cutaway portions or collared through-holes provided with collars having a predetermined height around the through-holes are formed at predetermined intervals in predetermined directions (arranged in matrix).

The metal thin plate 210 having the through-holes or cutaway portions, for example, is hereinafter referred to as a metal strip 211.

The metal strip 211 processed in this manner, in which a plurality of heat exchanger fins to be a product are arranged in a width direction, is formed.

An inter-row slit device 225 is therefore provided at a downstream position relative to the mold 220. After the metal strip 211 is formed by the mold press unit 218, the metal strip 211 is fed intermittently by a feeding device 226 to the inter-row slit device 225. The inter-row slit device 225 cuts the metal strip 211 by an upper blade 225A and a lower blade 225B that engage with each other, so that the metal strip 211 has a predetermined product width. Thus, a product-width metal strip 211A that has a strip shape being long in a conveying direction can be formed.

The product-width metal strip 211A formed by the inter-row slit device 225 is cut to have a predetermined product length by a cutter 227, and thus, heat exchanger fins 213 as final products are formed. The heat exchanger fins 213 formed in this manner are housed in a stacker 228. In the stacker 228, a plurality of pins 229 are provided to stand up in a vertical direction, and the heat exchanger fins 213 are stacked and held in the stacker 228 in a manner that the pins 229 are inserted into the through-holes or the cutaway portions of the heat exchanger fins 213.

CITATION LIST

Patent Literature

PTL1: Japanese Patent Application Laid-open No. 2006-21876

SUMMARY OF INVENTION

Technical Problem

In the conventional apparatus 200 for manufacturing heat exchanger fins, the feeding device 226 conveys the metal strips 211 formed by the mold 220 (mold press unit 218) by an intermittent feeding mechanism, what is called a hitch feeding mechanism.

In the intermittent feeding mechanism typified by the hitch feeding mechanism, when the metal strips 211 are conveyed, a hitch pin needs to be inserted into the metal strip 211 and when the hitch feeding mechanism is returned from the conveying direction of the metal strip 211, the hitch pin needs to be retracted from the metal strip 211; thus, there has been a restriction in increasing the speed of conveying the metal strips 211.

Moreover, if the metal strips 211 are conveyed using the hitch feeding mechanism at high speed, components of the hitch feeding mechanism may collide with each other to generate noise or be damaged.

In view of the above, the present invention has been made to solve the problem, and has an object of enabling the high-speed conveyance of a molded body for heat exchanger fins that is formed by a mold, and preventing deformation of the molded body for heat exchanger fins and generation of noise during conveyance of the molded body for heat exchanger fins by stable and accurate conveyance.

Solution to Problem

An apparatus for conveying heat exchanger fins according to the present invention is a conveying apparatus that, in manufacturing heat exchanger fins having through-holes through which heat exchanger tubes are inserted, conveys in a predetermined direction a molded body for heat exchanger fins having been obtained by providing a metal thin plate with the through-holes, before the metal thin plate is cut into a predetermined length in a conveying direction. The apparatus includes: a rotary conveying body including a plurality of protrusions that are tapered and able to enter the through-holes, and including a rotation shaft in a direction orthogonal to the conveying direction of the molded body for heat exchanger fins in a horizontal plane; and a rotary conveying body driving unit that rotates and drives the rotary conveying body about the rotation shaft. A side surface shape of each of the protrusions is formed to have a shape to enable the protrusion to enter the corresponding through-hole with a space maintained in synchronization with a rotation of the rotation shaft, and retract from the through-hole while the protrusion comes in contact with the through-hole and conveys the molded body for heat exchanger fins.

This structure can eliminate the necessity of using the hitch feeding mechanism. Thus, the molded body for heat exchanger fins can be conveyed at high speed without generating the noise or damaging the components.

In addition, at least a part of the side surface shape of the protrusion may be formed by an involute curve.

Moreover, a lower guide plate that supports a lower surface of the molded body for heat exchanger fins, and an upper guide plate that covers an upper surface of the molded body for heat exchanger fins may be provided.

This structure can prevent the molded body for heat exchanger fins from fluttering in the conveyance of the molded body for heat exchanger fins. Furthermore, the depth where the protrusion enters the cutaway portion provided to the molded body for heat exchanger fins can be made constant, and thus, the molded body for heat exchanger fins can be conveyed stably.

In addition, the rotary conveying body driving unit may be a servomotor, and the servomotor may have a rotation shaft that is directly connected to the rotation shaft of the rotary conveying body.

This structure can easily change the conveying distance by controlling the rotation angle of the servomotor. Furthermore, the structure can be reduced in cost and size.

Advantageous Effects of Invention

According to the present invention, the high-speed conveyance of a molded body for heat exchanger fins can be performed, and deformation of the molded body for heat exchanger fins and generation of noise during the conveyance of the molded body for heat exchanger fins can be prevented by stable and accurate conveyance.

DESCRIPTION OF EMBODIMENTS

First Embodiment

Figure 1:
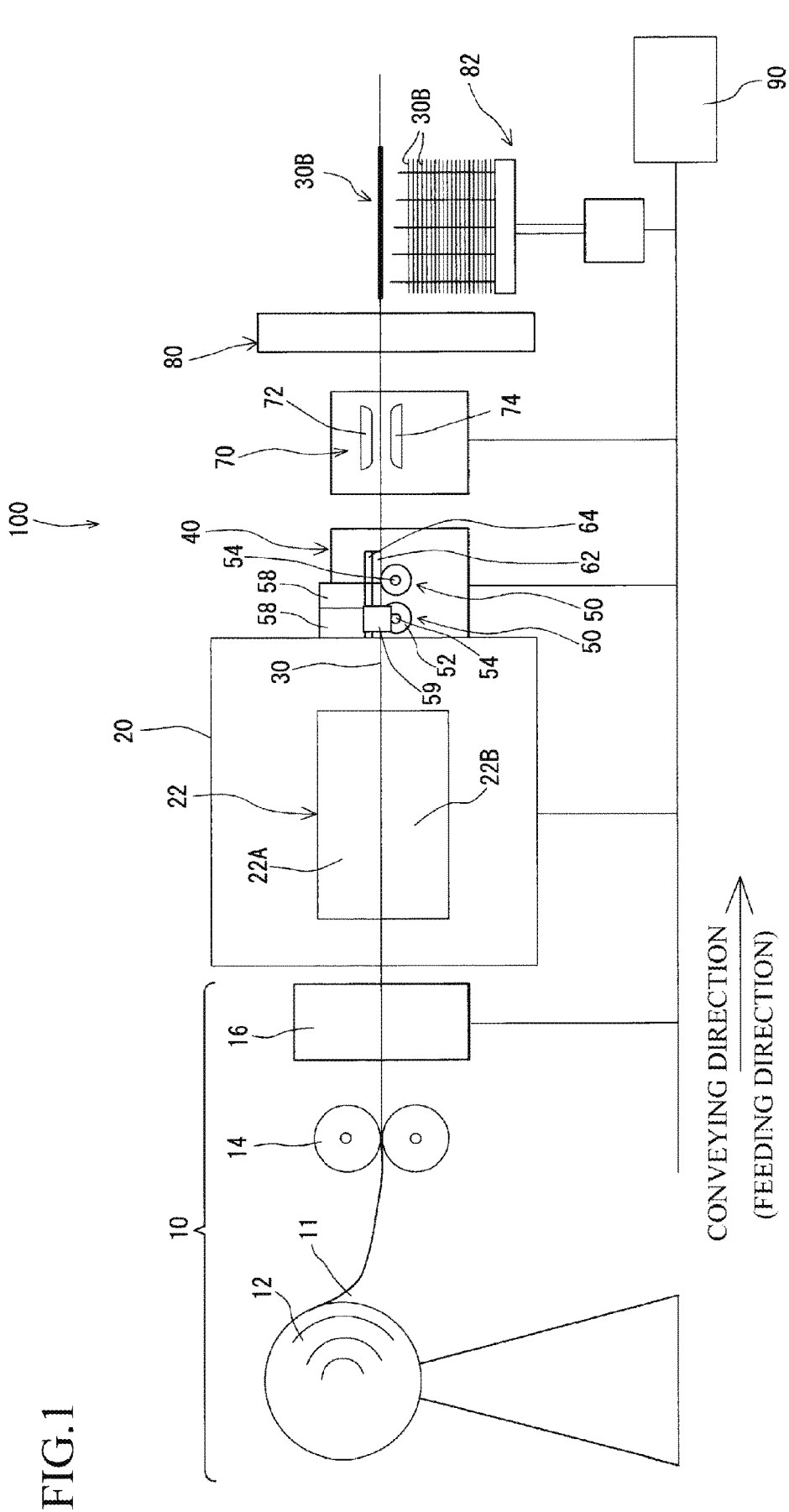
FIG. 1 is a side view illustrating an entire structure of an apparatus for manufacturing heat exchanger fins.

An overall structure of an apparatus 100 for manufacturing heat exchanger fins is illustrated in FIG. 1. Heat exchanger fins are formed in a manner that a metal strip obtained by pressing a metal thin plate 11 in a mold press unit 20 is molded so as to have a product width and a product length of the heat exchanger fins.

Moreover, a molded body for heat exchanger fins refers to a concept covering both a metal strip obtained by pressing the metal thin plate 11 in the mold press unit 20 and a product-width metal strip obtained by dividing the metal strip by a product width of the heat exchanger fins.

In other words, the molded body for heat exchanger fins refers to a metal strip obtained by providing the metal thin plate 11 with through-holes, before the metal thin plate 11 is cut into a predetermined length (before cut into a product length) in a conveying direction.

The metal thin plate 11 that is formed of aluminum or the like as a material of the molded body for heat exchanger fins and that is not processed yet has been wound around an uncoiler 12 in a coil shape. The metal thin plate 11 is pulled out from the uncoiler 12 and then further pulled out via pinch rollers 14. Next, machining oil is applied on the metal thin plate 11 by an oil application device 16 and then, the metal thin plate 11 is intermittently fed to the mold press unit 20 that has a mold 22 inside. Here, the uncoiler 12, the pinch rollers 14, and the oil application device 16 constitute a material supply unit 10. The structure of the material supply unit 10 is just an example and is not limited to the structure described in the present embodiment.

The mold 22 according to the present embodiment includes an upper die set 22A and a lower die set 22B. The upper die set 22A is provided to be capable of contacting or separating from the lower die set 22B. By the mold press unit 20 including the mold 22 as above, a molded body 30 for heat exchanger fins having tube insertion portions 31 as through-holes through which round heat exchanger tubes are inserted into the metal thin plate 11 is formed.

Figure 2:
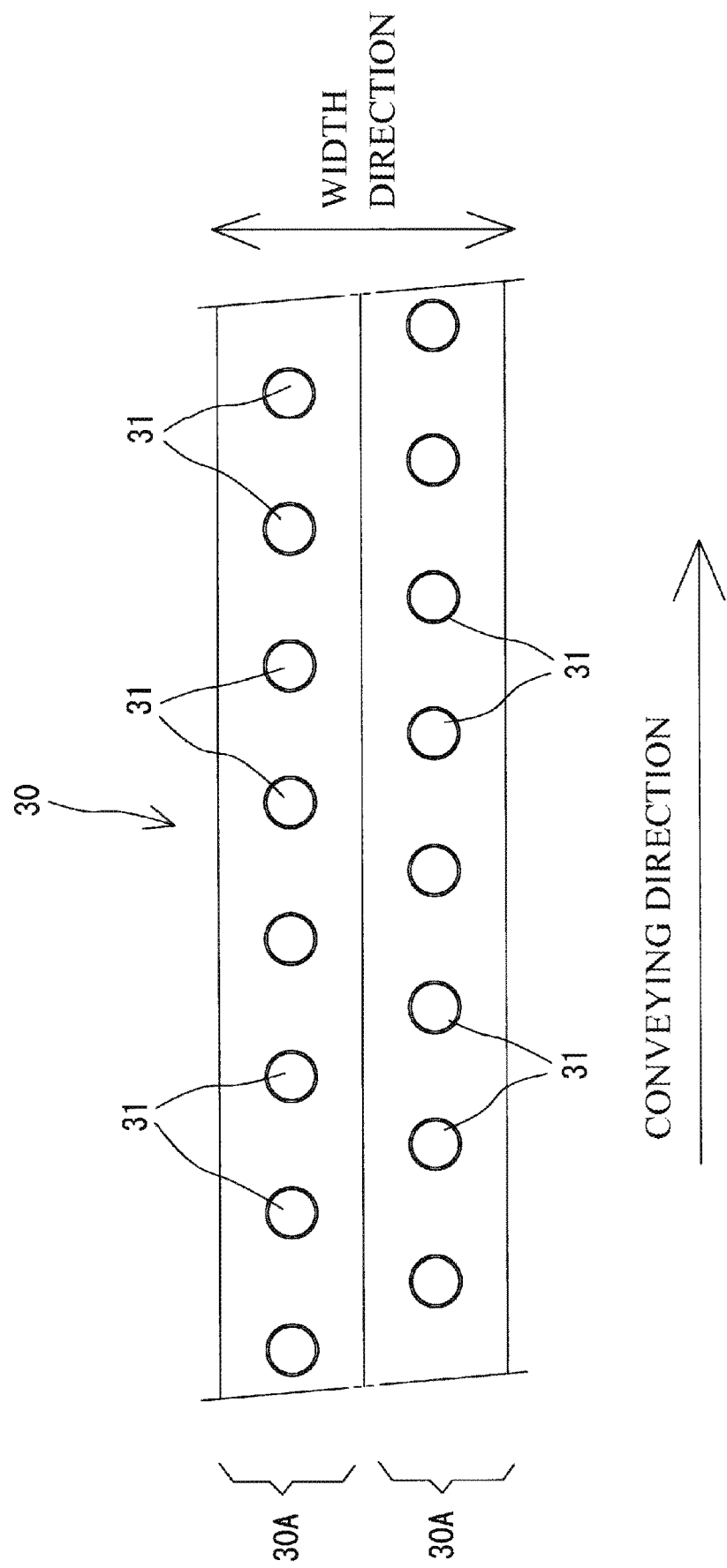
FIG. 2 is a plan view of a molded body for heat exchanger fins.

FIG. 2 illustrates the molded body 30 for heat exchanger fins that is formed by the mold 22.

The molded body 30 for heat exchanger fins illustrated in FIG. 2 includes molded bodies 30A for heat exchanger fins, each having a product width, arranged in a plurality of rows in a width direction that is orthogonal to a predetermined conveying direction in a horizontal plane.

The molded body 30 for heat exchanger fins is continuous in the conveying direction and in the direction orthogonal to the conveying direction in the horizontal plane, and FIG. 2 illustrates a part thereof, that is, two rows of the molded bodies 30A for heat exchanger fins with the product width.

For the molded body 30 for heat exchanger fins, the tube insertion portions 31 are provided at a plurality of positions on each of products obtained by separating the molded body 30 for heat exchanger fins into pieces. To the tube insertion portions 31, the heat exchanger tubes (not illustrated) are inserted and cause a heat exchange medium to flow.

Note that the tube insertion portion 31 in the present embodiment is a through-hole with a collar and the metal around the through-hole protrudes upward in a cylindrical shape.

Here, in the areas of the molded body 30 for heat exchanger fins except the tube insertion portions 31, an area continuous in the conveying direction is regarded as a flat area of the molded body 30 for heat exchanger fins (hereinafter also simply referred to as a flat area).

In the molded body 30 for heat exchanger fins in the present embodiment, the molded body 30A for heat exchanger fins with the product width and the adjacent molded body 30A for heat exchanger fins with the product width are different in the molding position of the tube insertion portion 31 in the conveying direction.

Specifically, the molded bodies 30A for heat exchanger fins with the product width have the through-holes 31 at the positions displaced from each other in the conveying direction, so that the tube insertion portion 31 on one side and the tube insertion portion 31 on the other side are formed between the counterpart tube insertion portions 31 arranged in the conveying direction. In other words, the tube insertion portions 31 of the molded body 30 for heat exchanger fins with the product width arranged in the width direction are formed alternately.

Now, the description of the overall structure of the apparatus 100 for manufacturing heat exchanger fins is continued. The molded body 30 for heat exchanger fins formed by the mold 22 housed in the mold press unit 20 is conveyed intermittently in a predetermined direction (here, toward an inter-row slit device 70) by a conveying apparatus 40 that is provided on the downstream side relative to the mold press unit 20.

The feeding timing of the conveying apparatus 40 is controlled by an operation control unit 90 to be described below so that the conveying apparatus 40 operates in synchronization with (in conjunction with) the operation of the mold press unit 20, and thus stable intermittent feeding is possible.

Figure 3:
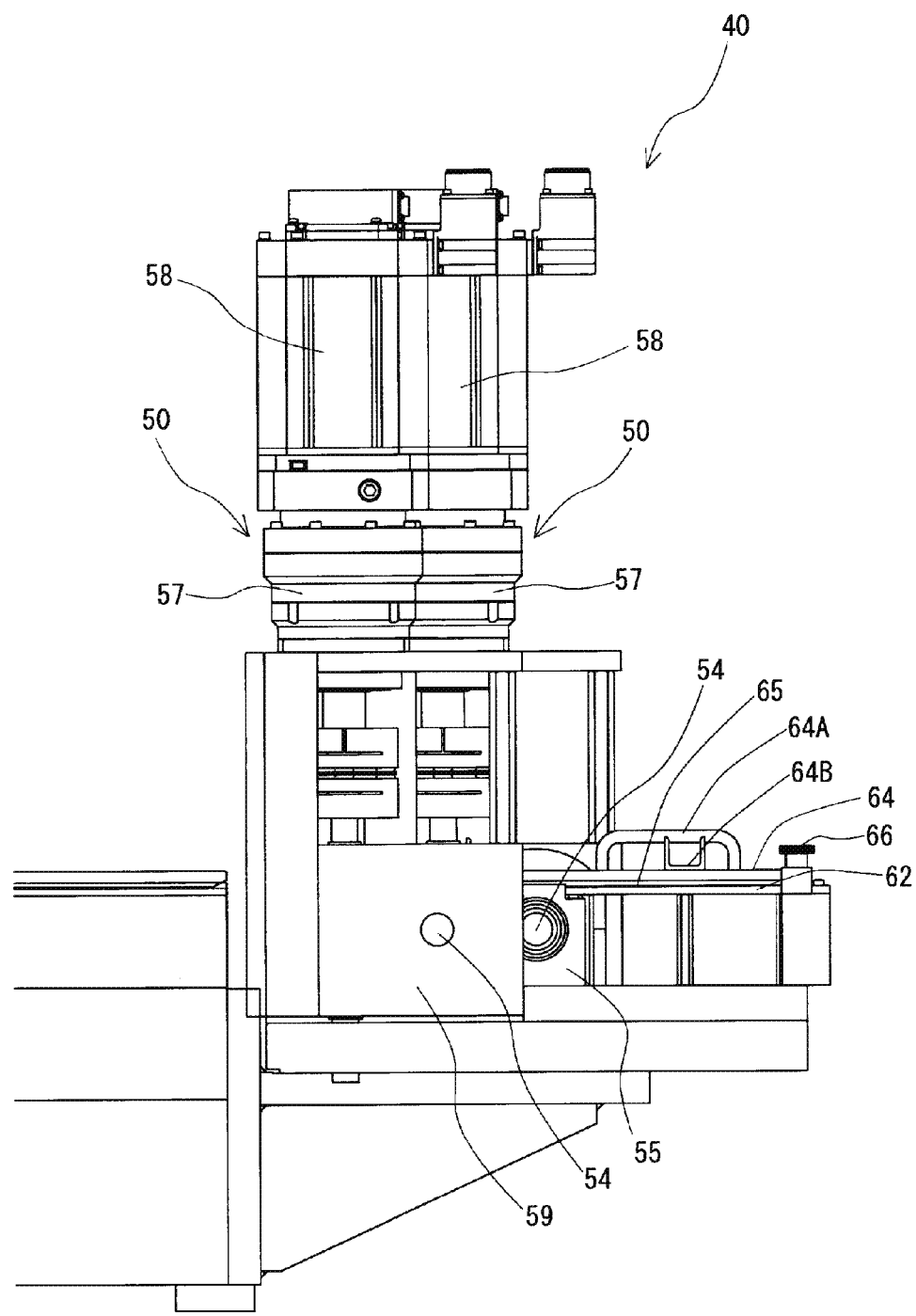
FIG. 3 is a side view of a conveying apparatus according to a first embodiment.
Figure 4:
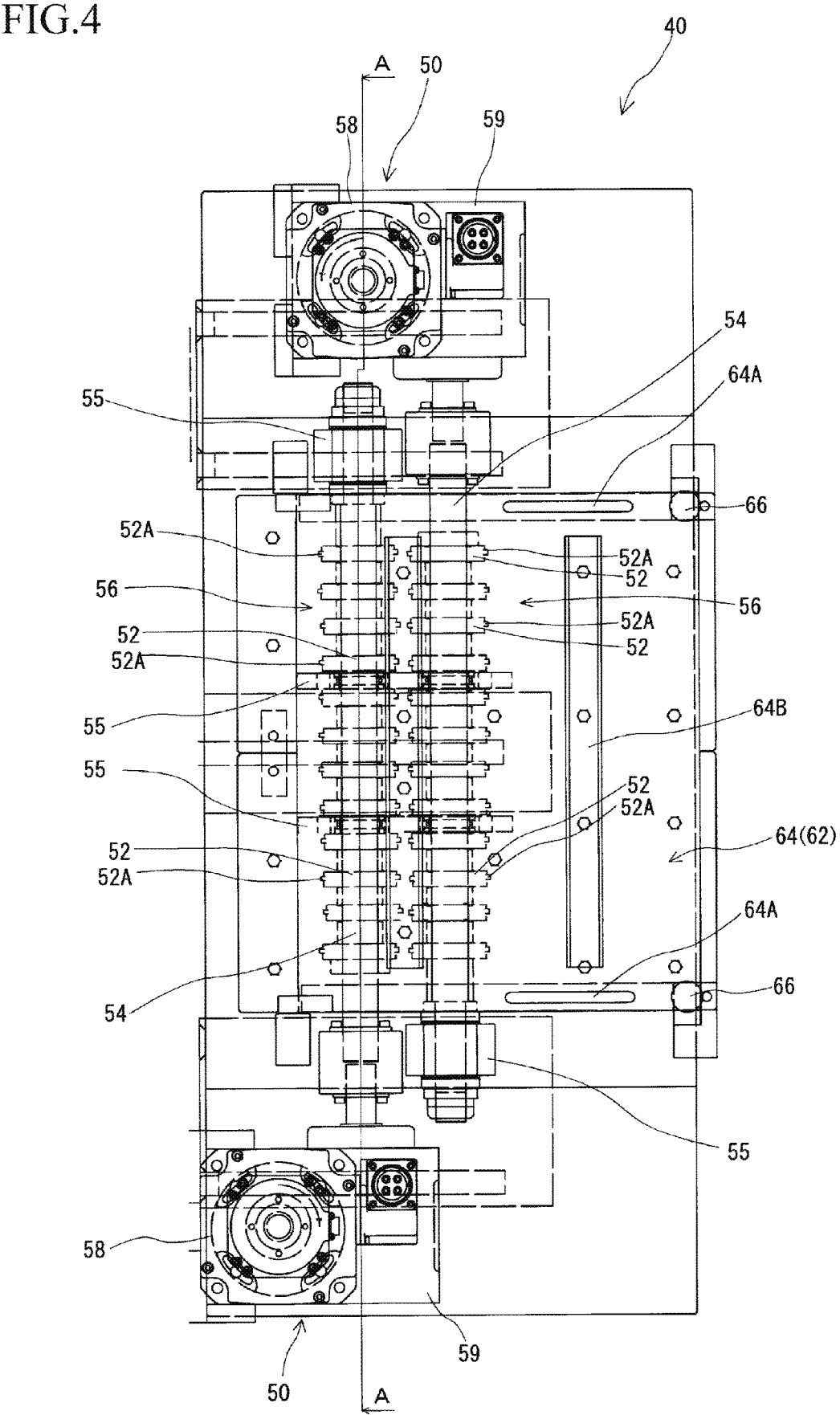
FIG. 4 is a plan view of the conveying apparatus according to the first embodiment.
Figure 5:
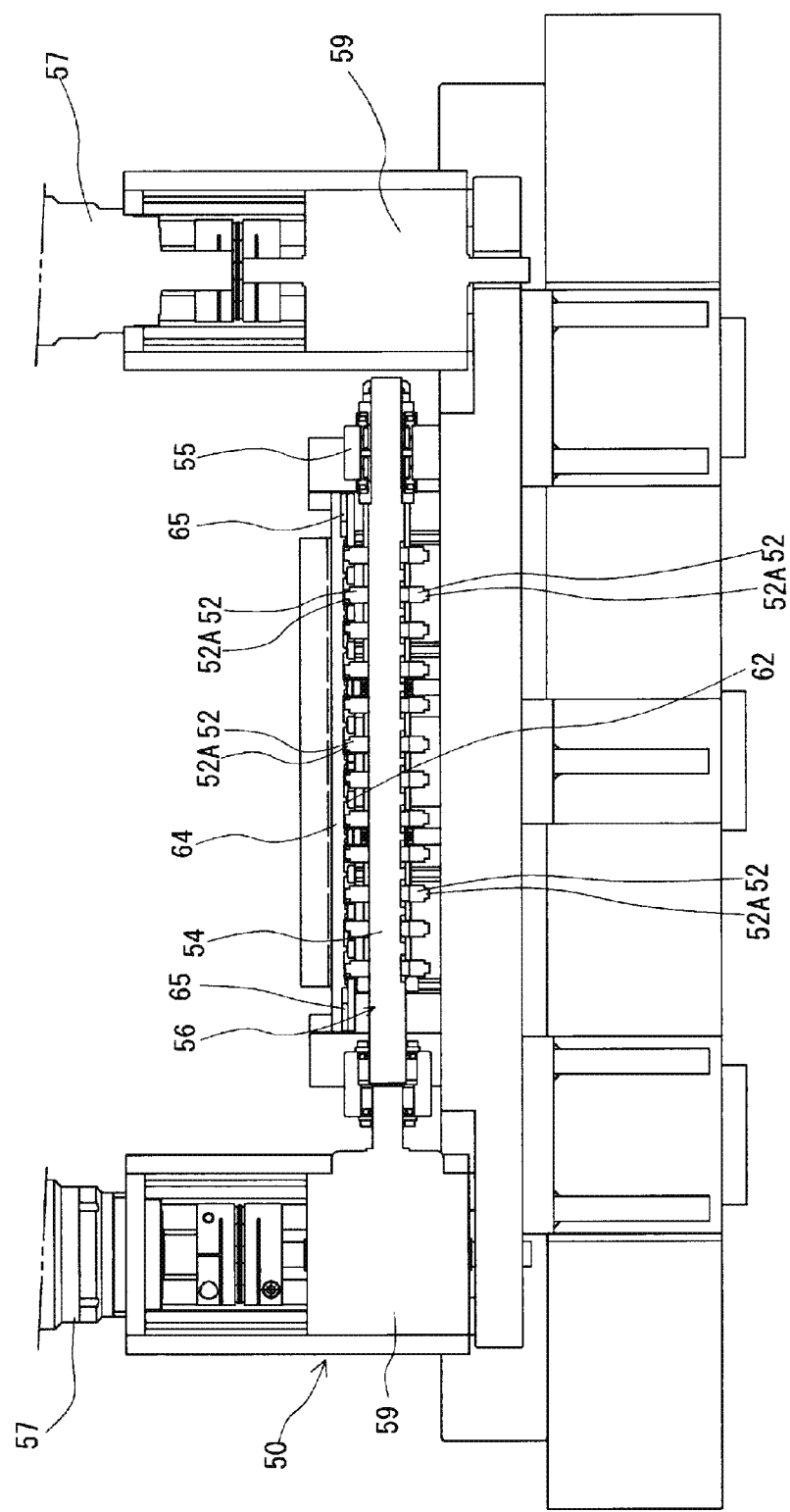
FIG. 5 is a front view of the conveying apparatus according to the first embodiment.
Figure 6:
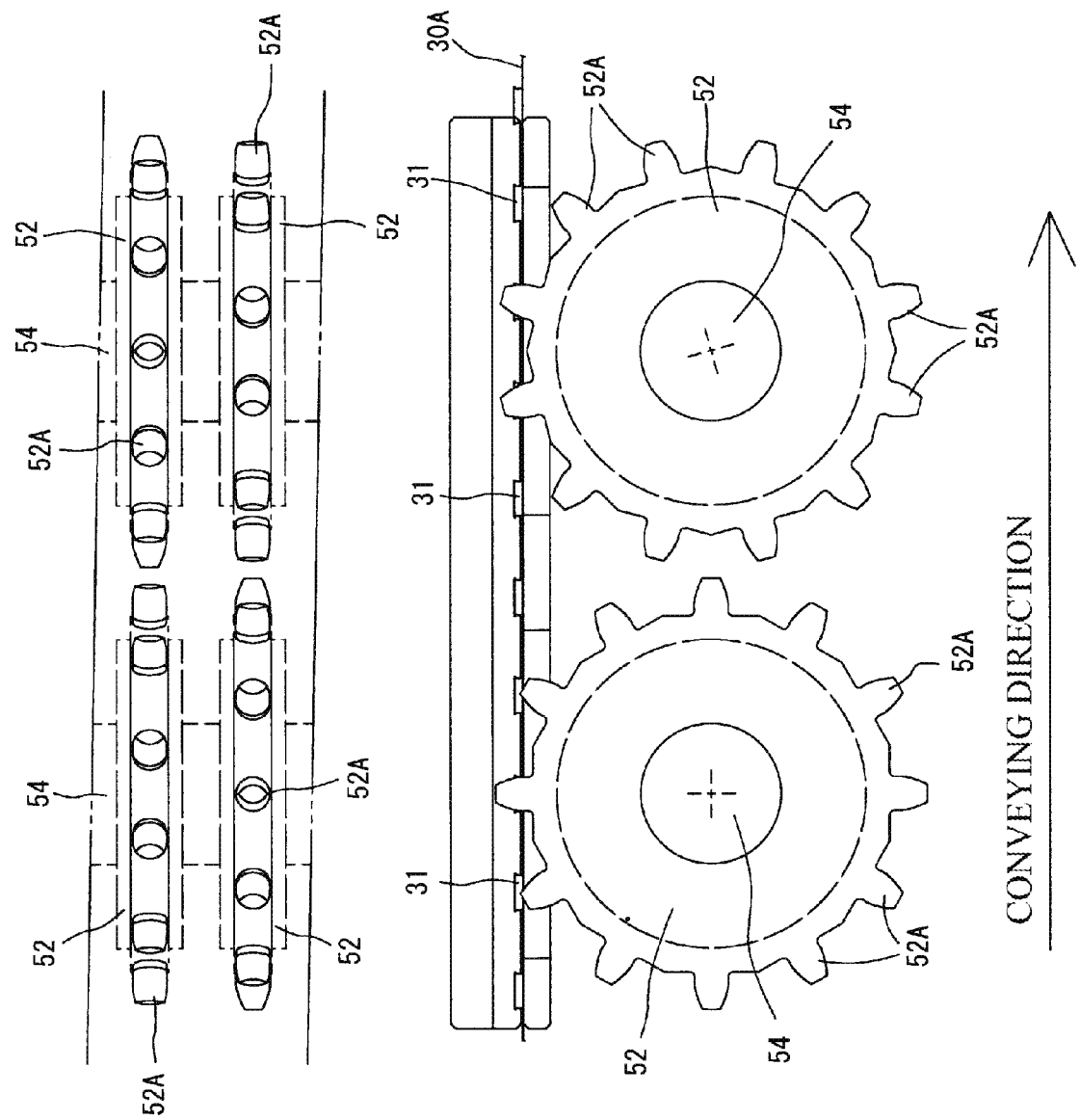
FIG. 6 is an explanatory view illustrating a state of a protrusion of a rotary disk.

FIG. 3 is a side view of the conveying apparatus 40, FIG. 4 is a plan view of the conveying apparatus 40, and FIG. 5 is a front view of the conveying apparatus 40. FIG. 6 is an explanatory view of a rotary conveying body 56 of a conveying unit 50.

The conveying apparatus 40 in the present embodiment includes a plurality of conveying units 50 that are provided at predetermined intervals in the conveying direction of the molded body 30 for heat exchanger fins. In the present embodiment, two conveying units 50 are provided in the conveying direction.

Each of the conveying units 50 in the present embodiment includes the rotary conveying body 56, and a rotary conveying body driving unit 58 that rotates and drives the rotary conveying body 56 around a rotation shaft that is orthogonal to the conveying direction of the molded body 30 for heat exchanger fins in the horizontal plane.

The rotary conveying body 56 includes a plurality of rotary disks 52 each having protrusions 52A on an outer peripheral surface, and rotation shafts 54 that each penetrate a central part of a main plane of each of the rotary disks 52 and extend in a width direction.

The plurality of rotary disks 52 are provided in the width direction to each of the rotation shafts 54.

In the present embodiment, the number of the provided rotary disks 52 is the same as the number of molded bodies 30A for heat exchanger fins with the product width formed in the width direction of the molded body 30 for heat exchanger fins.

Figure 7:
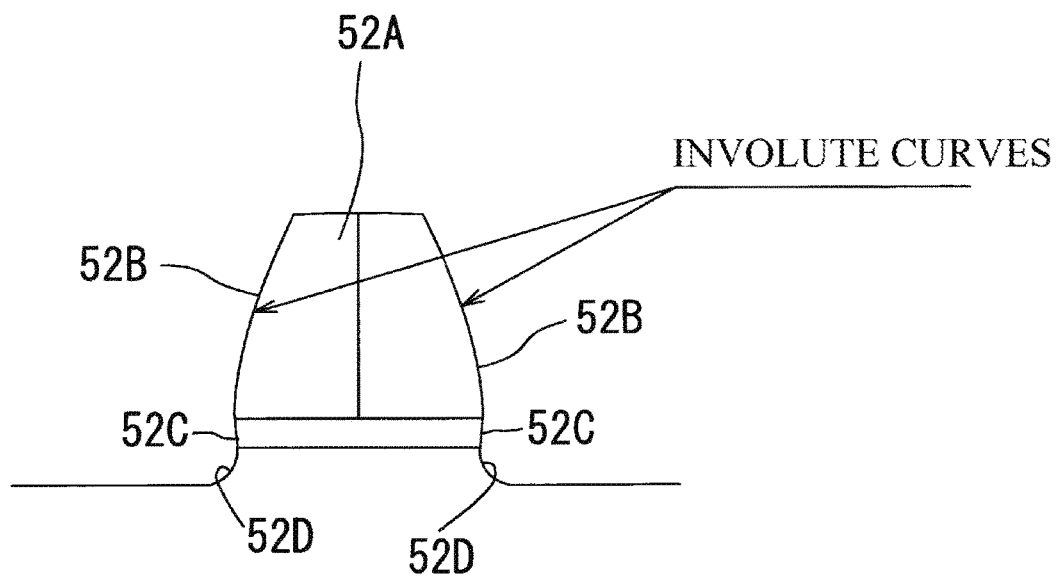
FIG. 7 is a side view of the protrusion to be inserted into a tube insertion portion.
Figure 8:
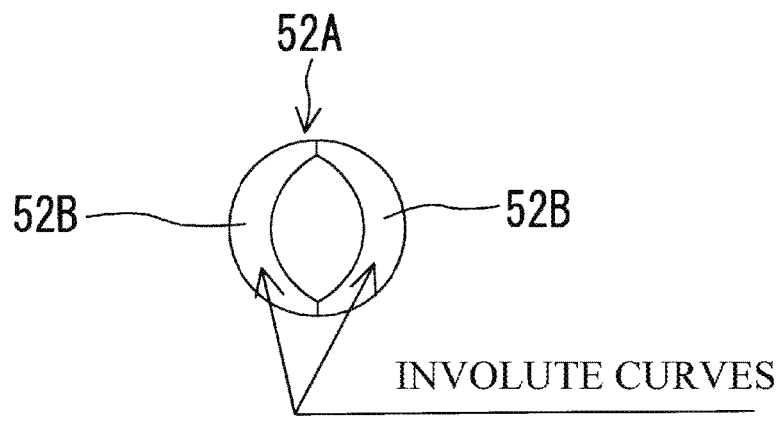
FIG. 8 is a plan view of the protrusion to be inserted into the tube insertion portion.
Figure 8:
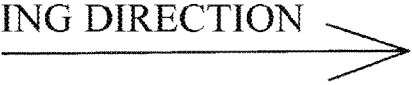

FIG. 7 is a side view of the protrusion 52A, and FIG. 8 is a plan view of the protrusion 52A.

The protrusions 52A are provided on the outer peripheral surface of the rotary disk 52 so as to protrude in a radial direction.

The protrusion 52A has a function of, by being inserted into the tube insertion portion 31 of the molded body 30 for heat exchanger fins, pulling the molded body 30 for heat exchanger fins as the rotary conveying body 56 rotates.

The protrusion 52A is formed so as to have what is called a tapered shape, that is, the shape is gradually narrowed (toward an upper end side) as it rises from the outer peripheral surface of the rotary disk 52 (base part). Note that, as illustrated in FIG. 8, the direction where the protrusion 52A becomes much narrower is a direction on a front surface (downstream) side and a rear surface (upstream) side in the conveying direction. It is not necessary that the protrusion 52A becomes excessively narrow in the width direction.

The protrusion 52A with such a shape can enter the tube insertion portion 31 with a space maintained and retract from the tube insertion portion 31 while the protrusion 52A conveys the molded body for heat exchanger fins in contact with the tube insertion portion 31.

More specifically, in regard to the protrusion 52A to be inserted into the tube insertion portion 31, at least a part of an outer surface 52B of the protrusion 52A that comes to the front side (downstream side in the conveying method of the heat exchanger fins) in the rotating direction when the rotary disk 52 conveys the molded body 30 for heat exchanger fins is formed by an involute curve. In FIG. 7 and FIG. 8, however, both the front surface side 52B and the rear surface side 52B of the outer surface of the protrusion 52A are formed by the involute curve.

The shape of the outer surface of the protrusion 52A is not limited to the involute curve.

The front surface side 52B of the outer surface of the protrusion 52A is formed by the involute curve. Thus, when the rotary disk 52 is rotated to make the protrusion 52A enter the tube insertion portion 31 gradually, the contact resistance between the outer surface of the protrusion 52A and an inner wall surface of the tube insertion portion 31 can be reduced to enable the smooth entry of the protrusion 52A.

In addition, when the protrusion 52A retracts from the tube insertion portion 31 by the rotation of the rotary disk 52, the contact resistance between the outer surface of the protrusion 52A and the inner wall surface of the tube insertion portion 31 can be reduced to enable the smooth retraction of the protrusion 52A.

A part of the protrusion 52A below the involute curve has an inverted-tapered surface 52C that becomes gradually narrower toward the outer peripheral surface (base part) of the rotary disk 52. By the inverted-tapered surface 52C, the protrusion 52A does not scratch at (interfere with) a lower edge of the through-hole 31 when the rotary disk 52 rotates.

A rising part between the inverted-tapered surface 52C of the protrusion 52A and the outer peripheral surface of the rotary disk 52 is formed to have an arbitrary curved surface 52D.

The number of protrusions 52A, the arrangement of the protrusions 52A, and the length of the protrusion 52A are the same among the rotary disks 52. In other words, in regard to the installation angle of the rotary disks 52 for one rotation shaft 54, the rotary disks 52 are attached so that the protrusions 52A have a predetermined angle phase difference.

More specifically, the rotary disks 52 are provided to one rotation shaft 54 along the axial direction, and the rotary disks 52 are provided so that the protrusions 52A are disposed at the different positions relative to an upper surface of the rotation shaft 54.

In the drawings illustrating the present embodiment, two rotary disks 52 are provided to one rotation shaft 54, and either one rotary disk 52 is provided so that the protrusion 52A comes right above the rotation shaft 54 and the other rotary disk 52 is provided so that an intermediate part between the protrusion 52A and the protrusion 52A comes right above the rotation shaft 54.

In this manner, the phase difference is provided to the protrusions 52A on the rotary disks 52 for one rotation shaft 54. Accordingly, when the molded bodies 30A for heat exchanger fins with the product width that are displaced from each other in the conveying direction are fed to come right above the rotation shaft 54, the protrusions 52A can be inserted into the tube insertion portions 31 of one molded body 30A for heat exchanger fins with the product width and the other molded body 30A for heat exchanger fins with the product width at the synchronous timing.

In addition, in the present embodiment, a servomotor is employed as the rotary conveying body driving unit 58 (hereinafter the servomotor is also denoted by 58). The servomotor 58 is disposed so that a rotation shaft thereof directs downward vertically, and the rotation shaft of the servomotor 58 is connected to the rotation shaft 54 through a cam index 59.

In this manner, since the servomotor 58 and the rotation shaft 54 are connected through the cam index 59, the rotation shaft 54 can be rotated and driven intermittently even if the servomotor 58 is driven at a constant speed.

Here, the cam index 59 has a cam profile that synchronizes with a pressing operation of the mold press unit 20. In addition, an output shaft of the cam index 59 is formed to have a cam profile that can repeat conveyance of the molded body 30 for heat exchanger fins by a predetermined length in one cycle operation in accordance with the installation state of the protrusions 52A provided to the rotary disk 52.

The cam index 59 preferably has a cam profile that makes the protrusion 52A enter the tube insertion portion 31 of the molded body 30 for heat exchanger fins in a state of standing up in a direction orthogonal to the conveying plane when one cycle operation of intermittently feeding the molded body 30 for heat exchanger fins of the apparatus 100 for manufacturing heat exchanger fins ends. This is convenient in that the protrusion enters the tube insertion portion 31 of the molded body 30 for heat exchanger fins in an optimal state, so that the molded body 30 for heat exchanger fins can be smoothly conveyed at the start of the conveyance and deformation of the molded body 30 for heat exchanger fins can be prevented.

The disposition interval (shaft-to-shaft distance) of disposing the conveying units 50 with such a structure (shaft-to-shaft distance) may be determined as appropriate and it is preferable to employ the intervals that are calculated in accordance with an expression represented in Table 1.

$$L = P1 \times (M + 1/N) \qquad \text{[Table 1]}$$

L: shaft-to-shaft distance of conveying unit
P1: pitch of molded product (product pitch)
M: arbitrary integer
N: the number of conveying units (the number of shafts of conveying units)

As illustrated in FIG. 4, one end side of the rotation shaft 54 of the conveying unit 50 is connected to the servomotor 58, and the other end side is rotatably held by a holder 55 typified by a bearing holder or the like. The servomotor 58 is connected to the rotation shaft 54 (output shaft of servomotor) through a decelerator 57 and the cam index 59 in a state that the servomotor 58 is disposed in an offset arrangement on the upstream side in the conveying direction relative to the position on the axial line of the center axis (rotation shaft) of the rotation shaft 54 (the servomotor 58 may be disposed in the offset arrangement on the downstream side in the conveying direction).

The conveying units 50 adjacent to each other in the conveying direction of the molded body 30 for heat exchanger fins are provided in a manner that the rotary conveying body driving units 58 thereof are alternately disposed in the direction orthogonal to the conveying direction of the molded body 30 for heat exchanger fins in the horizontal plane.

By arranging the conveying units 50 in a plane shape in this manner, the servomotors 58 can be disposed close to the mold press unit 20. The width dimensions of the servomotors 58 in the conveying direction can be overlapped with each other partially in the conveying direction of the molded body 30 for heat exchanger fins. In other words, the space that the conveying apparatus 40 occupies is reduced, whereby the conveying apparatus 40 can be reduced in size, and therefore the whole apparatus 100 for manufacturing heat exchanger fins can be reduced in size.

In addition, in regard to the connection between the servomotor 58 and the rotation shaft 54 in each conveying unit 50, the servomotor 58 may be connected to the rotation shaft 54 through the decelerator 57 and the cam index 59 as described in the present embodiment, the servomotor 58 may be connected to the rotation shaft 54 through the cam index 59 only, the servomotor 58 may be connected to the rotation shaft 54 through the decelerator 57 only, or the output shaft of the servomotor 58 may be directly connected to the rotary conveying body 56 (the rotation shaft 54 thereof).

In other words, how the rotary conveying body 56 (the rotation shaft 54 thereof) and the servomotor 58 are connected is not limited to a particular mode.

Furthermore, the operation of the servomotor 58 in each conveying unit 50 is controlled by the operation control unit 90 so that at least the rotation driving operations of both units synchronize with the pressing operation of the mold press unit 20 (i.e., so that the rotation speeds are synchronized).

In another structure of the molded body 30 for heat exchanger fins, the tube insertion portions 31 of the molded bodies 30 for heat exchanger fins with the product width may be provided at the same positions in the width direction instead of the molded bodies 30A for heat exchanger fins with the product width that are displaced from each other in the conveying direction.

In this case, the protrusions 52A of the rotary disk 52 in one conveying unit 50 are provided at the same position without a phase difference.

In a case where the tube insertion portions 31 of the molded bodies 30 for heat exchanger fins with the product width are at the same positions in the width direction in this manner, the number of conveying units 50 to be disposed in the conveying apparatus 40, and the timings when the protrusions 52A of the rotary disks 52 in the respective conveying units 50 become orthogonal to the conveying plane (horizontal plane) are preferably at equal intervals. In the present embodiment, the two conveying units 50 constitute the conveying apparatus 40, and therefore, the angle phase difference between the protrusions 52A in the respective conveying units 50 is set to an angle interval value obtained by dividing the angle interval of the protrusions 52A provided to the rotary disk 52 by 2. In other words, for one rotation shaft 54, the other rotation shaft 54 is connected to the output shaft of the cam index 59 at the position to satisfy the angle interval value obtained by dividing the angle interval of the protrusions 52A provided to the rotary disk 52 by 2. Thus, the angle phase difference relative to the state in which the protrusion 52A stands up in a direction orthogonal to the conveying plane is provided.

In a case where the tube insertion portions 31 of the molded bodies 30 for heat exchanger fins with the product width are at the same positions in the width direction in the above manner, by providing the angle phase difference to the protrusions 52A in the conveying units 50 as described above, the protrusion 52A of any one conveying unit 50 among the conveying units 50 disposed along the conveying direction can enter or retract from the tube insertion portion 31. This is therefore convenient in that an external force that acts in the conveyance of the molded body 30 for heat exchanger fins can be made constant, deformation of the molded body 30 for heat exchanger fins can be prevented, and the smooth conveyance can be performed.

Figure 9:
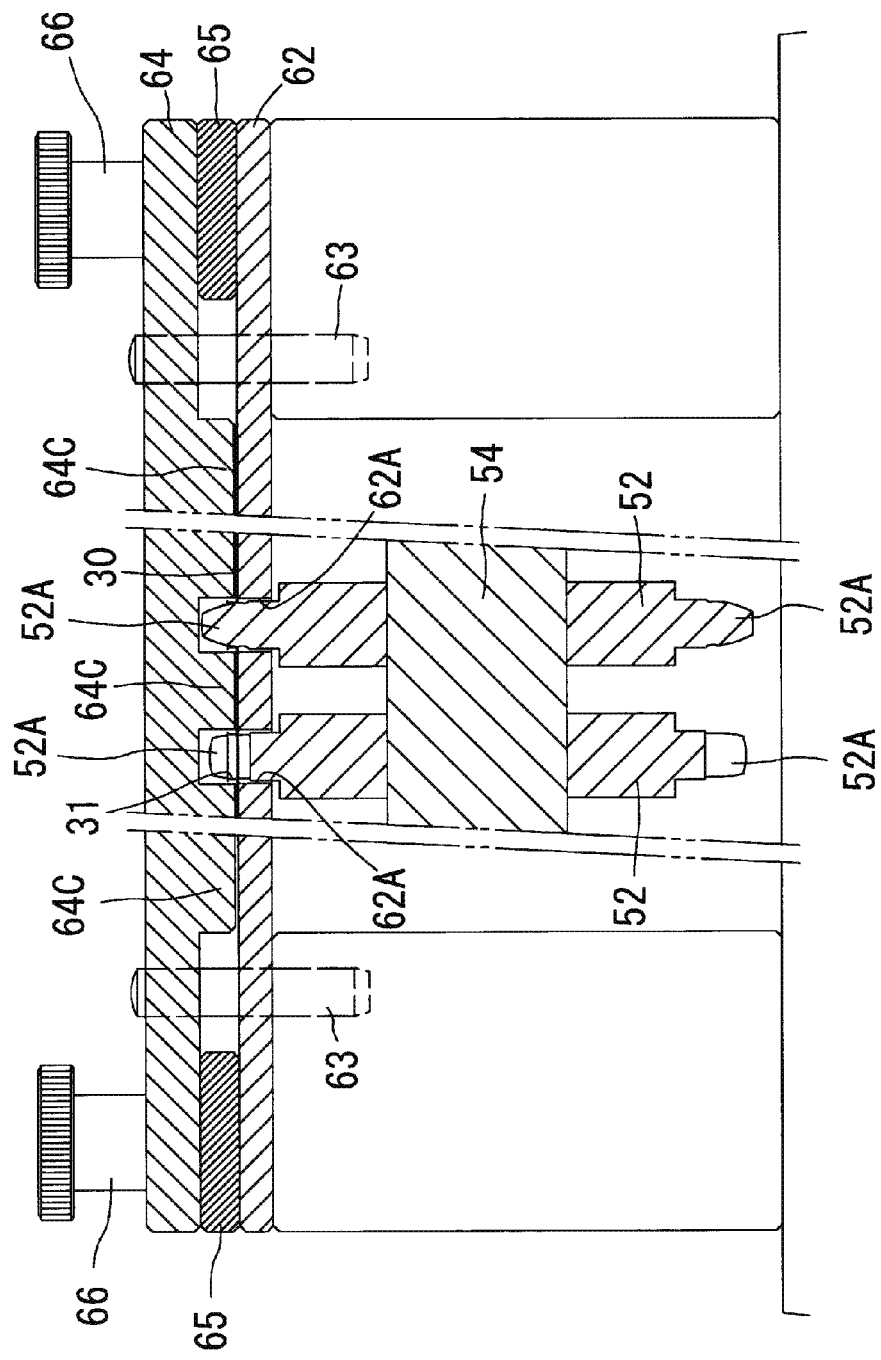
FIG. 9 is a front view in which a part of the conveying apparatus is magnified.

As illustrated in FIG. 3 and FIG. 9, in the present embodiment, a lower guide plate 62 is provided at an exit position of the mold press unit 20. The lower guide plate 62 guides a height position of a lower surface of the molded body 30 for heat exchanger fins so as to be the same in a predetermined length range (supports the lower surface of the molded body 30 for heat exchanger fins).

The lower guide plate 62 is provided in a range from the upstream side to the downstream side of the conveying units 50. The lower guide plate 62 may be integrated or separately provided in an upstream part, an intermediate part, and a downstream part of the conveying unit 50.

Through the lower guide plate 62, a penetration hole 62A that penetrates in a plate thickness direction is formed. In a state that a part of the protrusion 52A (rotary disk 52) projects from the penetration hole 62A, the rotary disk 52 of the conveying unit 50 is housed. An end part of the protrusion 52A comes to the position above the height position of the upper surface of the lower guide plate 62 when the protrusion 52A stands up relative to the conveying plane (when one cycle operation of intermitting feeding the molded body 30 for heat exchanger fins ends).

Above the lower guide plate 62, an upper guide plate 64 is disposed with a spacer 65 held between the lower guide plate 62 and the upper guide plate 64. The upper guide plate 64 can cover an upper surface of the molded body 30 for heat exchanger fins.

The upper guide plate 64 is provided to be able to switch (rotate) between a state in which the upper guide plate 64 overlaps the lower guide plate 62 and another state in which the upper guide plate 64 is flipped at an edge part on the mold press unit 20 side serving as an axis of rotation. When the molded body 30 for heat exchanger fins is conveyed usually, the upper guide plate 64 overlaps the lower guide plate 62 with a predetermined space held in a plate thickness direction. This space is formed by the spacer 65 disposed between the lower guide plate 62 and the upper guide plate 64.

An upper surface of the upper guide plate 64 has a handle 64A and a reinforcement member 64B attached thereto. When an operator grips the handle 64A and lifts up the upper guide plate 64, the upper guide plate 64 can be flipped from the lower guide plate 62.

A lower surface of the upper guide plate 64 has a convex part 64C that protrudes downward at a corresponding position in the flat area of the molded body 30 for heat exchanger fins. In a normal state, a space is formed between the convex part 64C and the flat area of the molded body 30 for heat exchanger fins.

In addition, guide plate pressing bolts 66 are provided to fix the upper guide plate 64 and the lower guide plate 62. Tightened with the guide plate pressing bolts 66, the upper guide plate 64 is fixed to the lower guide plate 62 with the spacer 65 interposed therebetween.

In addition, positioning pins 63 are provided penetrating through the upper guide plate 64 and the lower guide plate 62 vertically.

By the positioning pins 63, the upper guide plate 64 and the lower guide plate 62 can be positioned certainly and the displacement in the horizontal plane can be prevented.

In the molded body 30 for heat exchanger fins discharged from the mold press unit 20, the convex part 64C of the upper guide plate 64 comes in contact with the flat area of the molded body 30 for heat exchanger fins only when a change (fluttering) occurs in the plate thickness direction of the molded body 30 for heat exchanger fins; thus, the change can be restricted. This suppresses the variation in depth where the protrusion 52A of the conveying unit 50 enters the tube insertion portion 31 of the molded body 30 for heat exchanger fins, and thus, the height position of the conveying plane of the molded body 30 for heat exchanger fins can be maintained at a predetermined height position. The restriction of the change in the plate thickness direction of the molded body 30 for heat exchanger fins causes the convex part 64C to come in contact with the flat area of the molded body 30 for heat exchanger fins; thus, deformation of the molded body 30 for heat exchanger fins does not occur.

Note that the inter-row slit device 70 is provided on a downstream side relative to the conveying apparatus 40. The inter-row slit device 70 includes an upper blade 72 disposed on an upper surface side of the molded body 30 for heat exchanger fins, and a lower blade 74 disposed on a lower surface side of the molded body 30 for heat exchanger fins.

The inter-row slit device 70 may have an independent motive power source, or the inter-row slit device 70 may be operated by using a vertical movement of the mold press unit 20. The upper blade 72 and the lower blade 74 of the inter-row slit device 70 are formed to be long in the conveying direction. The molded body 30 for heat exchanger fins that is intermittently fed is cut by the upper blade 72 and the lower blade 74, and thus, molded bodies 30A for heat exchanger fins each having a product width and corresponding to an intermediate object of a product that is long in the conveying direction are formed. Here, the inter-row slit device 70 is disposed on the downstream side relative to the conveying apparatus 40 but may alternatively be disposed on the upstream side position relative to the conveying apparatus 40.

The molded bodies 30A for heat exchanger fins, which have been cut by the inter-row slit device 70 so as to have the product width, are sent into a cutoff device 80 where the molded bodies 30A for heat exchanger fins with the product width are cut into a predetermined length. Thus, heat exchanger fins 30B corresponding to a final product can be obtained. The heat exchanger fins 30B are stacked in a stack device 82, and every stack of a predetermined number of heat exchanger fins 30B is conveyed to a next step where the heat exchanger fins 30B are assembled into a heat exchanger that is not illustrated.

The apparatus 100 for manufacturing heat exchanger fins according to the present embodiment includes the operation control unit 90 including a CPU and a storage unit (not illustrated). The storage unit of the operation control unit 90 stores operation control programs in advance for performing operation controls over the units included in the apparatus 100 for manufacturing heat exchanger fins. The CPU reads the operation control programs from the storage unit, and performs the operation controls over the units in accordance with the operation control programs. By performing the operation controls over the units by the CPU and the operation control programs, a series of operations in the units of the apparatus 100 for manufacturing heat exchanger fins can be performed in conjunction.

The operation control unit 90 controls the operation of the rotary conveying body driving units 58 so as to synchronize the rotation operations of the rotation shafts 54 and also synchronize these operations with the rotation of a crank shaft of the mold press unit 20. After one cycle of intermittently feeding the molded body 30 for heat exchanger fins (after one cycle operation) ends, any one of the protrusions 52A of each rotary disk 52 stands up in the direction orthogonal to the conveying plane of the molded body 30 for heat exchanger fins. Specifically, the output shaft of the cam index 59 and the rotation shaft 54 are connected so that the protrusion 52A of the rotary disk 52 stands up at the position where the intermittent operation (one cycle operation) of the cam index 59 starts.

Second Embodiment

Next, description is made of an embodiment in which a feeding device 110 is provided to feed the metal thin plate 11, before being subjected to a pressing process by the mold 22, into the mold press unit 20 in synchronization with the conveying operation of the conveying apparatus 40 on the upstream side relative to the mold 22.

Note that in the present embodiment, the number of conveying units 50 in the conveying apparatus 40 is not limited to two.

The feeding device 110 is provided on the upstream side relative to the mold 22 for the purpose of reducing the load on the metal thin plate 11 due to the conveyance by the conveying unit 50 only, and maintaining the high processing accuracy by the mold 22.

More specifically, if the metal thin plate 11 is fed by the feeding device 110 before the molded body 30 for heat exchanger fins is conveyed by the conveying apparatus 40, the metal thin plate 11 is bent once on the upstream side relative to the mold press unit 20. Then, the conveying apparatus 40 pulls the metal thin plate 11 to correct the bent metal thin plate 11. Thus, the load on the molded body 30 for heat exchanger fins due to the conveying apparatus 40 can be reduced and the bending of the metal thin plate 11 in the mold 22 can be prevented.

Figure 10:
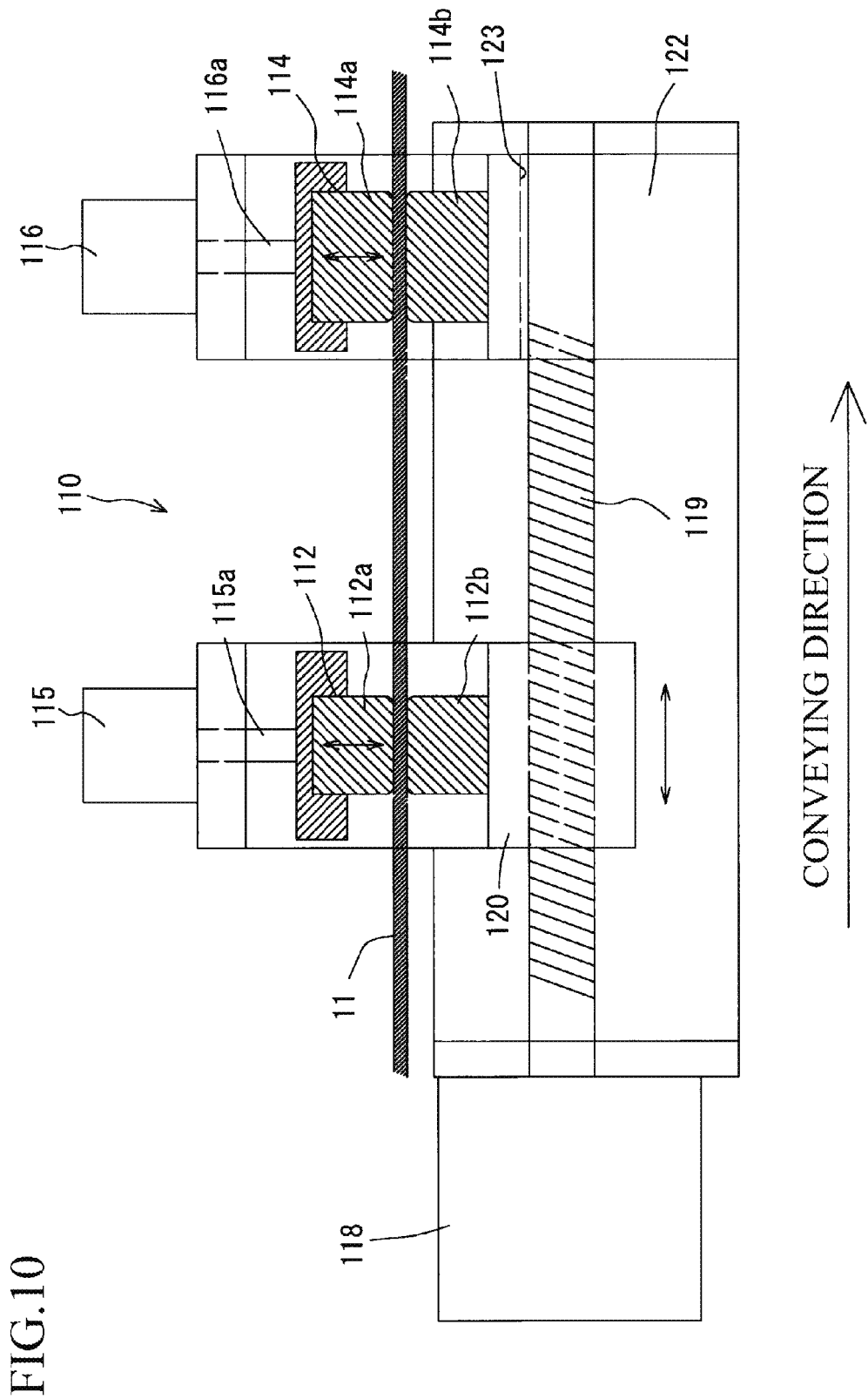
FIG. 10 is a side view of a feeding device according to a second embodiment.

FIG. 10 illustrates a structure of the feeding device 110.

Here, a gripper feeder is used as one example of the feeding device 110.

The gripper feeder (feeding device) 110 includes two clampers 112 and 114 for holding the metal thin plate 11 from above and below. Of the two clampers in the gripper feeder 110, the fixed clamper 114 that is not movable in the conveying direction is provided on the downstream side in the conveying direction (on a side closer to the mold 22 to be described below), and the movable clamper 112 that is movable in the conveying direction is provided on the upstream side in the conveying direction.

The movable clamper 112 includes an upper clamper 112a that is positioned on an upper surface side of the metal thin plate 11 and is to be in contact with an upper surface of the metal thin plate 11, and a lower clamper 112b that is positioned on a lower surface side of the metal thin plate 11 and is to be in contact with a lower surface of the metal thin plate 11. The upper clamper 112a and the lower clamper 112b may be formed of iron, urethane, or other materials.

The movable clamper 112 is provided so that the upper clamper 112a is movable vertically. The lower damper 112b is not vertically movable and is always in contact with the lower surface of the metal thin plate 11.

In order to move the upper clamper 112a of the movable clamper 112 vertically, the upper damper 112a is provided with a vertically moving means. One example of the vertically moving means is an air cylinder 115. A rod 115a of the air cylinder 115 is provided to the upper clamper 112a, and by the operation of the air cylinder 115, the upper clamper 112a can be in contact with or separated from the metal thin plate 11.

In a manner similar to the movable clamper 112, the fixed clamper 114 includes an upper clamper 114a that is positioned on the upper surface side of the metal thin plate 11 and is to be in contact with the upper surface of the metal thin plate 11, and a lower clamper 114b that is positioned on the lower surface side of the metal thin plate 11 and is to be in contact with the lower surface of the metal thin plate 11. The upper clamper 114a and the lower clamper 114b may be formed of iron, urethane, or other materials.

The fixed clamper 114 is provided so that the upper clamper 114a is movable vertically. The lower clamper 114b is not vertically movable and is always in contact with the lower surface of the metal thin plate 11.

In order to move the upper clamper 114a of the fixed clamper 114 vertically, the upper clamper 114a is provided with a vertically moving means. One example of the vertically moving means is an air cylinder 116. A rod 116a of the air cylinder 116 is connected to the upper clamper 114a, and by the operation of the air cylinder 116, the upper clamper 114a can be in contact with or separated from the metal thin plate 11.

Subsequently, description is made of a movement method for the movable clamper 112 along the conveying direction.

The movable clamper 112 is provided with a reciprocating means that enables the movable clamper 112 to reciprocate in the conveying direction. An example of the reciprocating means includes a servomotor 118 and a ball screw 119.

In the present embodiment, the lower clamper 112b of the movable clamper 112 is disposed on an upper surface of a movement base 120, and the movement base 120 can move linearly in response to the rotation movement of the ball screw 119. The ball screw 119 is disposed with an axial line thereof coinciding with the conveying direction. The ball screw 119 has one end connected to the servomotor 118, and as the servomotor 118 is driven, the ball screw 119 is rotated.

The movement base 120 extends from a side of the metal thin plate 11 to a place above the metal thin plate 11, and the upper clamper 112a and the air cylinder 115 are provided to the movement base 120. Therefore, as the movement base 120 reciprocates in the conveying direction, the upper clamper 112a, the air cylinder 115, and the lower clamper 112b can reciprocate in the conveying direction together with the movement base 120.

The lower damper 114b of the fixed clamper 114 is disposed on the upper surface of a fixed base 122. The fixed base 122 has a penetration hole 123 through which the ball screw 119 penetrates to avoid the contact, so that the fixed base 122 is not influenced by the rotation of the ball screw 119.

FIG. 11A to FIG. 11D illustrate the operation of the gripper feeder 110.

Figure 11A:
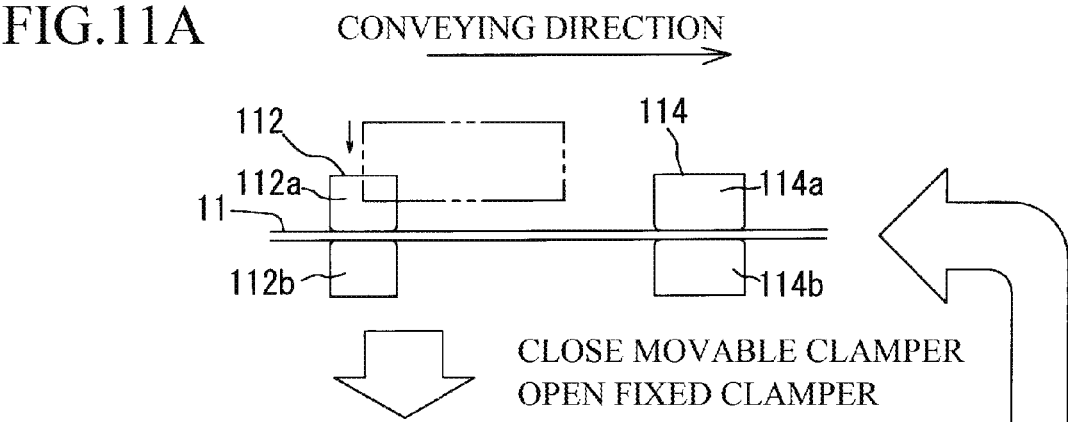
FIG. 11 is an explanatory view for describing an operation of the feeding device according to the second embodiment.

FIG. 11A illustrates a state in which both the movable clamper 112 and the fixed clamper 114 clamp the metal thin plate 11.

Figure 11B:
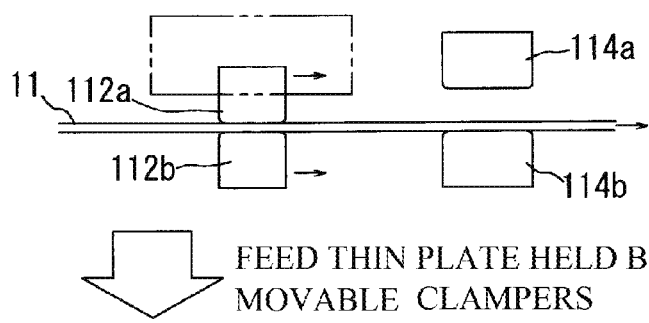

Next, as illustrated in FIG. 11B, the fixed clamper 114 is opened and the movable clamper 112 moves in the conveying direction while clamping the metal thin plate 11. This enables the metal thin plate 11 to be moved in the conveying direction.

Figure 11C:
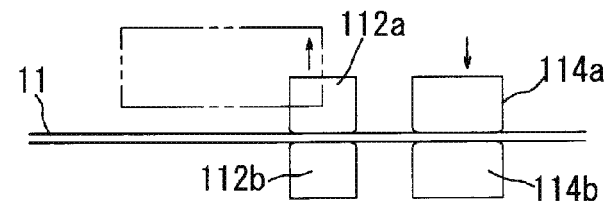

FIG. 11C illustrates a state in which the conveyance is completed. After the conveyance is completed, the movable clamper 112 is opened to cancel the clamping the metal thin plate 11. As the clamping of the movable damper 112 is cancelled, the fixed clamper 114 is closed to clamp the metal thin plate 11. Thus, the metal thin plate 11 is fixed at the conveyance position.

Figure 11D:
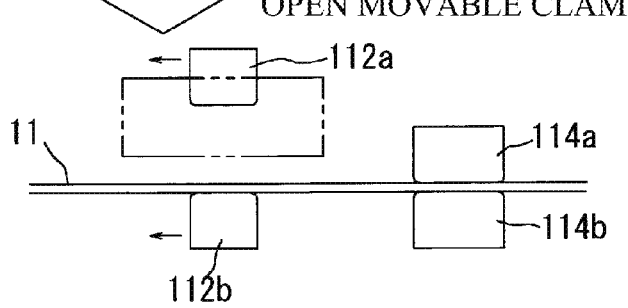

Then, as illustrated in FIG. 11D, the movable clamper 112 is returned to the position in FIG. 11A, that is, to the conveying start position in a state that the movable clamper 112 remains opened.

Although the vertically moving means that drives the upper dampers 112a and 114a to clamp the metal thin plate 11 in the movable damper 112 and the fixed clamper 114 are the air cylinders in the above example, the vertically moving means is not limited to the air cylinder and may be a hydraulic cylinder or a cam type.

In the present embodiment, in both the movable clamper 112 and the fixed clamper 114, the side disposed on the upper surface side of the metal thin plate 11 is capable of moving vertically. However, in both the movable clamper 112 and the fixed clamper 114, the side disposed on the lower surface side of the metal thin plate 11 may alternatively be capable of moving vertically to clamp the metal thin plate 11.

The reciprocating means to make the movable clamper 112 reciprocate in the conveying direction is not limited to the servomotor and the ball screw, and may be an air cylinder, a hydraulic cylinder, a cam type, or other structures.

Next, with reference to FIG. 12A to FIG. 12E, description is made of an operation of feeding the metal thin plate 11 by a synchronous control between the conveying apparatus 40 on the downstream side relative to the mold press unit 20 and the feeding device 110 (gripper feeder 110) on the upstream side relative to the mold press unit 20.

Note that in FIG. 12A to FIG. 12E, the detailed structure of the conveying apparatus 40, the detailed structure of the gripper feeder 110, and the like are omitted.

Between the gripper feeder 110 and the mold press unit 20, an upper surface holding member 125 and a lower surface holding member 127 are disposed with a predetermined distance therebetween in the conveying direction. The upper surface holding member 125 is in contact with the upper surface of the metal thin plate 11 before the metal thin plate 11 enters the mold press unit 20. The lower surface holding member 127 is in contact with the lower surface of the metal thin plate 11 before the metal thin plate 11 enters the mold press unit 20.

In the present embodiment, a roller is used as each of the upper surface holding member 125 and the lower surface holding member 127.

The upper surface holding member 125 is always in contact with the upper surface of the metal thin plate 11, and the lower surface holding member 127 is always in contact with the lower surface of the metal thin plate 11. The upper surface holding member 125 and the lower surface holding member 127 are provided to make the metal thin plate 11 bend before the metal thin plate 11 enters the mold press unit 20. The operation of the bending will be described below.

Although the lower surface holding member 127 is disposed on the upstream side and the upper surface holding member 125 is disposed on the downstream side in the present embodiment, the lower surface holding member 127 may be disposed on the downstream side and the upper surface holding member 125 may be disposed on the upstream side.

Figure 12A:
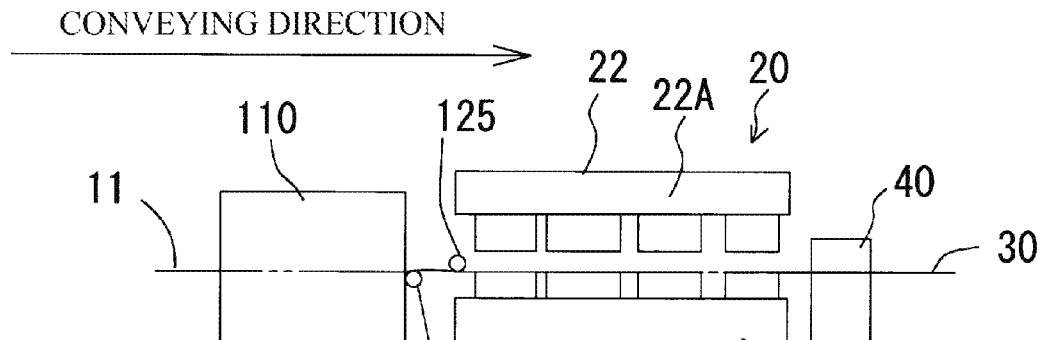
FIG. 12 is an explanatory view for describing an operation of the feeding device and a conveying unit according to the second embodiment.

FIG. 12A illustrates a state in which the upper die set 22A and the lower die set 22B of the mold 22 are opened after the pressing process. In the following FIG. 12B to FIG. 12E, the conveying apparatus 40 and the gripper feeder 110 convey in the conveying direction, the molded body 30 for heat exchanger fins after being processed by the upper die set 22A and the lower die set 22B. Thus, an unprocessed part of the metal thin plate 11 that is continued from the processed molded body 30 for heat exchanger fins is disposed between the upper die set 22A and the lower die set 22B.

Figure 12B:
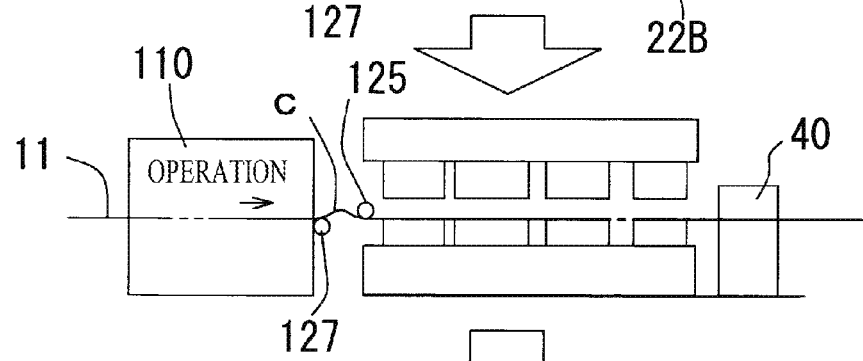

FIG. 12B illustrates that the operation of the gripper feeder 110 precedes the operation of the conveying apparatus 40. When the metal thin plate 11 is fed into the mold press unit 20 by the gripper feeder 110 before the conveying apparatus 40 starts the conveying operation, bending C occurs in the metal thin plate 11 between the upper surface holding member 125 and the lower surface holding member 127. This bending C occurs because, when the metal thin plate 11 is not conveyed by the conveying apparatus 40, the amount of conveyance of the metal thin plate 11 by the gripper feeder 110 is suppressed by the friction force between the upper surface of the metal thin plate 11 and the upper surface holding member 125 and the friction force between the lower surface of the metal thin plate 11 and the lower surface holding member 127.

Figure 12C:
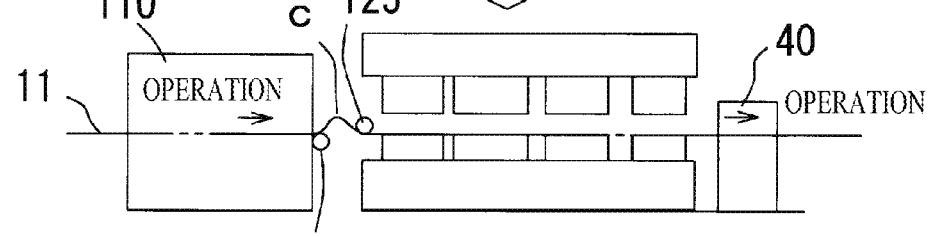

In FIG. 12C, the conveying apparatus 40 starts to operate with a delay after the gripper feeder 110 does.

In this case, the operation control unit 90 controls the conveying operation of the conveying apparatus 40 to synchronize with the conveying operation of the gripper feeder 110.

Since the conveyance is performed by both the conveying apparatus 40 and the gripper feeder 110 concurrently, the load on the molded body 30 for heat exchanger fins by the conveying apparatus 40 can be reduced.

In this case, the bending C also occurs in the metal thin plate 11 between the upper surface holding member 125 and the lower surface holding member 127. Since the bending C occurs on the upstream side relative to the mold press unit 20 in this manner, the bending in the mold 22 can be prevented. In other words, if some phase difference occurs in the conveyance in the conveying apparatus 40 and the gripper feeder 110, the metal thin plate 11 may flutter in the mold 22 or interfere with the upper die set 22A, in which case the product quality may be adversely influenced. In view of the above, the bending C is caused before the metal thin plate 11 enters the mold 22; thus, fluttering or bending in the metal thin plate 11 that is positioned in the mold 22 and pulled by the conveying apparatus 40 can be prevented.

Figure 12D:
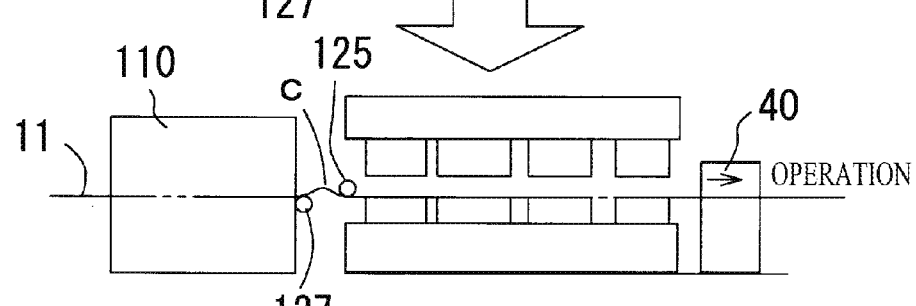

FIG. 12D illustrates that the conveying operation of the gripper feeder 110 ends before the conveying operation of the conveying apparatus 40. Since the conveying operation of the gripper feeder 110 ends, the bending C is corrected by the pulling of the conveying apparatus 40.

Figure 12E:
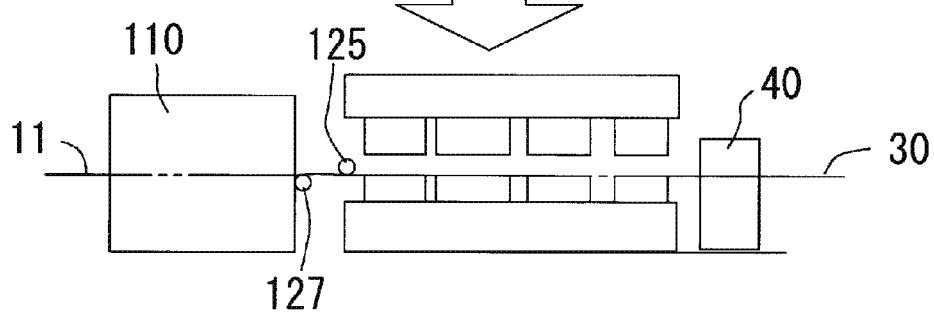
Figure 13:
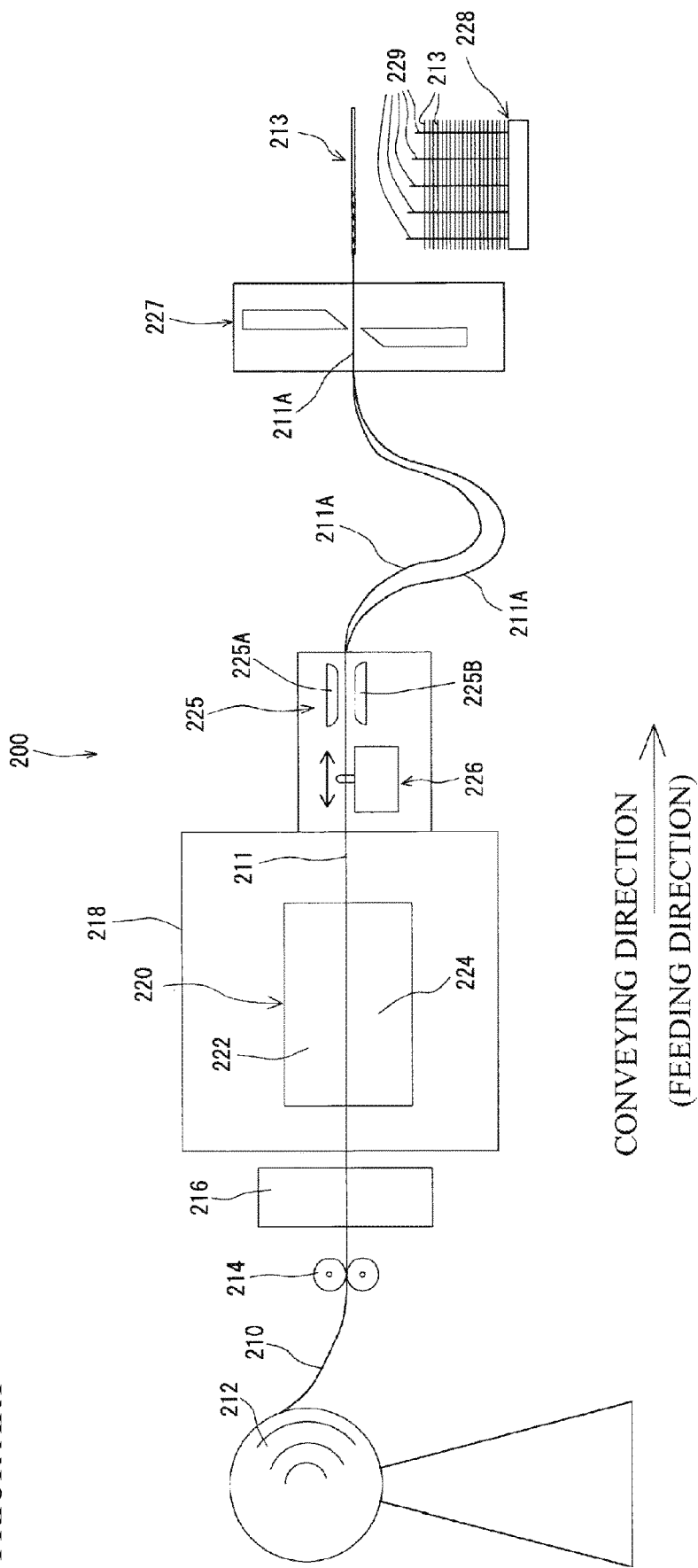
FIG. 13 is a side view of an apparatus for manufacturing heat exchanger fins in a conventional technique.

In FIG. 12E, the conveying operation of the conveying apparatus 40 also ends. In this state, the conveyance of the metal thin plate 11 to a predetermined position in the mold press unit 20 has been completed and the bending C has been corrected; thus, the metal thin plate 11 is in a flat state. Next, the mold 22 is closed (not illustrated) and the metal thin plate 11 is pressed to form the molded body 30 for heat exchanger fins.

(Other Embodiment)

Although the two conveying units 50 are provided in the conveying apparatus 40 in the above embodiments, the present invention is not limited to this example. In other words, the conveying apparatus 40 may include three or more conveying units 50 (not illustrated) that are disposed along the conveying direction of the molded body 30 for heat exchanger fins. The conveying apparatus 40 may alternatively include only one conveying unit 50 (not illustrated).

The conveying units 50 are not necessarily disposed at equal intervals, and it is only necessary that the conveying units 50 are disposed in accordance with the intervals of the products of the molded body 30 for heat exchanger fins. In short, it is only necessary that the operation control unit 90 performs the operation control so that the rotation operations (rotation speeds) of the rotation conveying bodies 56 of the conveying units 50 of the conveying apparatus 40 are in synchronization.

In the above embodiments, the rotation conveying body 56 has the structure in which the rotary disk 52 provided with the protrusions 52A is attached to the rotation shaft 54. However, the rotary conveying body 56 may have a structure in which the outer peripheral surface of the rotation shaft 54 has an uneven shape (shape with large-diameter parts and small-diameter parts) and the convex parts (large-diameter parts) function as the protrusions 52A.

Furthermore, in the above description, at the end of one cycle operation of intermittently feeding the molded body 30 for heat exchanger fins in the apparatus 100 for manufacturing heat exchanger fins, the entering angle of the protrusion 52A to enter the tube insertion portion 31 of the molded body 30 for heat exchanger fins is set so that the protrusion 52A stands up in the direction orthogonal direction of the conveying plane; however, the present invention is not limited to this example. In regard to the entering angle of the protrusion 52A to enter the tube insertion portion 31 of the molded body 30 for heat exchanger fins, at the restart of conveying the molded body 30 for heat exchanger fins, the angle range that does not deform the tube insertion portion 31 by the restart of the rotation and driving of the protrusion 52A is calculated in advance in accordance with the material and the plate thickness of the molded body 30 for heat exchanger fins, and the entering angle may be set in the calculated angle range.

In another example, the cam index 59 may be unused when the rotation shaft 54 and the rotary conveying body driving units 58 are connected in the conveying unit 50, and the operation control unit 90 may perform the operation control of the rotary conveying body driving unit 58 so that the rotating and driving operation of the rotary conveying body driving unit 58 and the press operation of the mold press unit 20 (operation of intermittently feeding the molded body 30 for heat exchanger fins) are in synchronization.

The apparatus 100 for manufacturing heat exchanger fins may employ the embodiments and modifications described above in combination as appropriate.

What is claimed is:

1. An apparatus for conveying heat exchanger fins that, in manufacturing heat exchanger fins having through-holes through which heat exchanger tubes are inserted, conveys in a predetermined direction a molded body for heat exchanger fins having been obtained by providing a metal thin plate with the through-holes, before the metal thin plate is cut into a predetermined length in a conveying direction, the apparatus for conveying heat exchanger fins comprising:

a rotary conveying body including a plurality of protrusions that are tapered and able to enter the through-holes, and including a rotation shaft in a direction orthogonal to the conveying direction of the molded body for heat exchanger fins in a horizontal plane; and a rotary conveying body driving unit that rotates and drives the rotary conveying body about the rotation shaft, wherein an entering angle of the protrusions to enter the through-holes of the molded body for heat exchanger fins is set to make the protrusions enter in a state of standing up in a direction orthogonal to the conveying plane or set within an angle range that does not deform a tube insertion portion when one cycle operation of intermittently feeding the molded body for heat exchanger fins ends, and wherein a side surface shape of each of the protrusions is formed to have a shape to enable the protrusion to enter the through-hole with a space maintained in synchronization with a rotation of the rotation shaft, and retract from the through-hole while the protrusion comes in contact with the through-hole and conveys the molded body for heat exchanger fins.

2. The apparatus for conveying a molded body for heat exchanger fins according to claim 1, wherein at least a part of the side surface shape of the protrusion is formed by an involute curve.

3. The apparatus for conveying a molded body for heat exchanger fins according to claim 1, further comprising a lower guide plate that supports a lower surface of the molded body for heat exchanger fins, and an upper guide plate that covers an upper surface of the molded body for heat exchanger fins.

4. The apparatus for conveying a molded body for heat exchanger fins according to claim 1, wherein the rotary conveying body driving unit is a servomotor, and the servomotor has a rotation shaft that is directly connected to the rotation shaft of the rotary conveying body.

5. The apparatus for conveying a molded body for heat exchanger fins according to claim 2, further comprising a lower guide plate that supports a lower surface of the molded body for heat exchanger fins, and an upper guide plate that covers an upper surface of the molded body for heat exchanger fins.

6. The apparatus for conveying a molded body for heat exchanger fins according to claim 2, wherein the rotary conveying body driving unit is a servomotor, and the servomotor has a rotation shaft that is directly connected to the rotation shaft of the rotary conveying body.

7. The apparatus for conveying a molded body for heat exchanger fins according to claim 3, wherein the rotary conveying body driving unit is a servomotor, and the servomotor has a rotation shaft that is directly connected to the rotation shaft of the rotary conveying body.

* * * * *